US011947937B2

(12) United States Patent
Sloat

(10) Patent No.: US 11,947,937 B2
(45) Date of Patent: Apr. 2, 2024

(54) SOFTWARE TOOL FOR DERIVING COLORS FROM A REFERENCE COLOR BY VARYING COLOR CHARACTERISTICS

(71) Applicant: Fresenius Medical Care Holdings, Inc., Waltham, MA (US)

(72) Inventor: Daniel Sloat, Waltham, MA (US)

(73) Assignee: Fresenius Medical Care Holdings, Inc., Waltham, MA (US)

( * ) Notice: Subject to any disclaimer, the term of this patent is extended or adjusted under 35 U.S.C. 154(b) by 0 days.

(21) Appl. No.: 17/558,697

(22) Filed: Dec. 22, 2021

(65) Prior Publication Data
US 2023/0195433 A1 Jun. 22, 2023

(51) Int. Cl.
*G06F 8/38* (2018.01)
*G06F 3/0482* (2013.01)
*G06F 3/0484* (2022.01)

(52) U.S. Cl.
CPC .............. *G06F 8/38* (2013.01); *G06F 3/0482* (2013.01); *G06F 3/0484* (2013.01)

(58) Field of Classification Search
CPC ......... G06F 8/38; G06F 3/0484; G06F 3/0482
See application file for complete search history.

(56) References Cited

U.S. PATENT DOCUMENTS

| 10,643,353 | B2 | 5/2020 | Baldwin |
| 10,748,505 | B1 | 8/2020 | Galiano |
| 11,212,449 | B1 * | 12/2021 | Manzari ............. H04N 5/23245 |
| 2006/0001665 | A1 * | 1/2006 | Kupersmit ............ G09B 11/10 |
| | | | 707/E17.143 |
| 2006/0022994 | A1 | 2/2006 | Hussie |
| 2008/0049043 | A1 | 2/2008 | Titmuss |
| 2008/0062192 | A1 | 3/2008 | Voliter |
| 2008/0062193 | A1 | 3/2008 | Olson |
| 2010/0293459 | A1 | 11/2010 | Ziegler |
| 2012/0076404 | A1 * | 3/2012 | Bryant .................... G06T 5/009 |
| | | | 382/167 |
| 2013/0207994 | A1 | 8/2013 | Rodeski |

(Continued)

FOREIGN PATENT DOCUMENTS

| JP | 2018022347 A | 2/2018 |
| WO | 2016022725 A1 | 2/2016 |

OTHER PUBLICATIONS

International Search Report and Written Opinion for the International Patent Application No. PCT/US2022/049890, dated 16 pages.

*Primary Examiner* — Andrea C Leggett
(74) *Attorney, Agent, or Firm* — KDW Firm PLLC

(57) ABSTRACT

The exemplary embodiments may provide a software tool that enables a software designer to derive a color from a reference color. The software designer may specify changes in color characteristics that are to be applied to the reference color to derive the desired color. The user interface may be provided to allow the software designer to enter information regarding the reference color and the desired changes in color characteristics. The user interface may display the reference color and that resulting desired color so that the software designer may get a visual appreciation for the difference in the colors. The software tool of the exemplary embodiments may also include a color palette generator. The color palette generator may generate a palette of colors from a reference color.

20 Claims, 17 Drawing Sheets

(56) References Cited

U.S. PATENT DOCUMENTS

| | | | |
|---|---|---|---|
| 2014/0292799 A1* | 10/2014 | Shekey | G06F 3/04847 |
| | | | 345/594 |
| 2017/0109029 A1 | 4/2017 | Lee | |
| 2019/0139268 A1 | 5/2019 | Pennig | |
| 2019/0368085 A1* | 12/2019 | Morgan | G06F 30/00 |
| 2019/0385434 A1* | 12/2019 | Yuds | A61M 1/267 |
| 2021/0027497 A1* | 1/2021 | Ding | G06N 3/02 |

* cited by examiner

Low Lighting Color Palette 1120
Medium Lighting Color Palette 1122
Bright Lighting Color Palette 1124
Figure 11B

SOFTWARE TOOL FOR DERIVING COLORS FROM A REFERENCE COLOR BY VARYING COLOR CHARACTERISTICS

BACKGROUND

When a software designer develops a graphical user interface (GUI), the software designer needs to mindful of the colors that are deployed in the GUI. The software designer should adopt good design practices, such as maintaining a sufficient contrast ratio between colors positioned adjacent to each other on a display and avoiding using red on green or green on red because these color combinations are difficult for people with color blindness to view. These good design practices may be captured in accessibility guidelines and/or design guidelines.

Compliance with the accessibility and design guidelines may prove difficult for a software designer. A software designer typically resorts to using a manual trial-and-error approach when choosing colors and color combinations for a GUI. For instance, the designer may make a best guess for a desired color, enter the color code for the color on a computing device to display the color on a display device and review the resulting color on the display device. While the accessibility and design guidelines may set forth guidelines that suggest certain color characteristics like contrast ratios, relative luminance values and/or saturations for colors and color combinations, the accessibility and design guidelines may not set forth how to achieve such color characteristics. Moreover, often a software designer may not even know what the values of color characteristics such as saturation, relative luminance and contrast ratio are for colors. The result is that the process of choosing color combinations for a GUI may be time consuming and error prone. In addition, the software designer may not ever realize the desired color combinations for the GUI.

In developing a GUI, a software designer may wish to define and use a palette of colors that relate to a reference color and that conform with accessibility and/or design guidelines. For example, given a root brand color for an organization, the software designer may wish to use a palette of colors that relate to the root brand color. Unfortunately, the software designer must employ a manual trial-and-error approach to developing such a color palette. This manual trial-and-error approach can be burdensome on the software designer. This approach may be time consuming and may result in a sub-optimal color palette.

SUMMARY

In accordance with an inventive aspect, a method is performed by a processor of an electronic device. Per the method, a user interface is output for display on a display device. The user interface includes an element for specifying a first color value for a first color and one or more elements for specifying a change in saturation, relative luminance and/or contrast ratio to be applied to the first color value to yield a desired color value for a desired color. Per the method, a specification of a change of at least two of saturation, relative luminance or contrast ratio are received via the user interface. The change of at least two of saturation, relative luminance or contrast ratio to the first color value with the processor is applied by the processor to yield the desired color value. An indication of the desired color value is output on the display device.

The outputting on the display device of an indication of the desired color value may include outputting the desired color on the display device. The first color may be displayed on the display device. The receiving via the user interface of a specification of a change of at least two of saturation, relative luminance or contrast ratio may comprise receiving a specification of a change in saturation and relative luminance or receiving a specification of a change in contrast ratio and saturation. The one or more elements for specifying a change in saturation, relative luminance and contrast ratio to be applied to the first color value to yield a desired color value may include an element for specifying a programmatically determined maximum saturation, a programmatically determined minimum saturation, a custom saturation or a same saturation as the first color. The one or more elements for specifying a change in saturation, relative luminance and contrast ratio to be applied to the first color value to yield a desired color value may include an element for specifying a programmatically determined maximum relative luminance, a programmatically determined minimum relative luminance, a custom relative luminance or a same relative luminance as the first color.

In accordance with another inventive aspect, a method is performed by a processor of an electronic device. The method includes outputting a user interface for display on a display device. The user interface includes an element for specifying a first color value for a first color and an element for specifying at least one desired characteristic of an unspecified desired color relative to the first color. The at least one desired characteristic is one of a same RGB ratio as the first color but with a different specified relative luminance than the first color, a same RGB ratio as the first color with a specified contrast ratio separation from the first color, and a different RGB ratio than the first color with a same relative luminance as the first color. A specification of the first color value is received via the user interface. A selection of the at least one desired characteristic is received via the user interface. Based on the received specification of the first color value and the selection of the at least one desired characteristic, the processor determines what color is the desired color that has the selected desired characteristic relative to the first color. An indication of the desired color is output on the user interface.

The first color value may be a red, green, blue (RGB) value. The indication of the desired color may be a RGB value for the desired color. The method may include outputting on the display device as part of the user interface an example of the first color having the first color value and an example of the desired color.

The at least one desired characteristic may be having the same RGB ratio as the first color but with a different specified relative luminance than the first color. In that case, the method may further comprise displaying an element on the user interface for receiving a specification of the different relative luminance, receiving the specification of the different relative luminance via the user interface, and determining a selected color that the same RGB ratio as the first color but with the different specified relative luminance than the first color. In that case, the selected color may be determined to be the desired color.

The at least one desired characteristic may be having the same RGB ratio as the first color with the specified contrast ratio separation from the first color. In that case, the method may further comprise displaying an element on the user interface for receiving a specification of the contrast ratio separation, receiving the specification of the contrast ratio separation via the user interface, and determining a selected color that has the same RGB ratio as the first color but has the specified contrast ratio separation from the first color. In that case, the selected color may be determined to be the desired color.

The at least one desired characteristic may be having a different RGB ratio than the first color with the same relative luminance as the first color. In that case, the method may further comprise displaying an element on the user interface for receiving a specification of the different RGB ratio, receiving the specification of the different RGB ratio via the user interface, and determining a selected color that has a different RGB ratio than the first color with the same relative luminance as the first color. In that case, the selected color may be determined to be the desired color.

In accordance with an additional inventive aspect, a method is performed by a processor of an electronic device. Per the method, an indication of a reference color value for a reference color is received. With the processor, a palette standard is applied to generate a palette of colors for use with the reference color in user interface design. The palette standard specifies how to derive colors to be included in the generated palette of colors from the reference color by modifying saturation, relative luminance and/or contrast ratio of the reference color.

The generated palette of colors may be partitioned into partitions that include a partition of colors designated for text. The generated palette of colors may be partitioned into partitions that include a partition of colors designated for control elements. The generated palette of colors may be partitioned into partitions that include a partition of colors designated for background use. The palette of colors may be for a particular lighting condition

BRIEF DESCRIPTION OF THE DRAWINGS

FIG. 10 depicts an illustrative color palette.

FIG. 11B depicts illustrative color palettes for different lighting conditions.

DETAILED DESCRIPTION

The exemplary embodiments may address the above-described shortcomings of the conventional approach for selecting colors to be included in a GUI. Such color selection by a software designer often entails determining what colors are suitable to be used together in a GUI, and then selecting for use in the GUI a subset of colors from the colors that are determined to be suitable for use in the GUI. The exemplary embodiments provide a software tool that enables a software designer to derive a color from a reference color. The software designer may specify changes in color characteristics, such as saturation, relative luminance and contrast ratio, that are to be applied to the reference color to derive the desired color. A user interface may be provided to allow the software designer to enter information regarding the reference color and the desired changes in color characteristics. The user interface may display the reference color and that resulting desired color so that the software designer may get a visual appreciation for the difference in the colors.

The software tool enables the software designer to select colors that are related to the reference color and that exhibit desired color characteristics relative to the reference color. The software tool enables color discovery and helps a software designer to better appreciate how changes in color characteristics, such as saturation, relative luminance, and contrast ratio, affect the resulting derive color.

The software tool of the exemplary embodiments may also include a color palette generator. The color palette generator may generate a palette of colors from a reference color. This may be especially useful in instances where a reference color, such as a root branding color for an organization like a corporation, is to serve as a foundation for the color palette that is deployed in a GUI. In the exemplary embodiments, a color palette standard may be created, and the software tool may apply a color palette standard to derive the colors of a color palette from the reference color. The color palette standard may specify how the colors in the resulting color palette are to be derived relative to the reference color. For example, the color palette standard may specify that background colors are to have a certain saturation difference relative to the reference color and are to have a certain contrast ratio separation relative to the reference color. The ability to generate such color palettes from a reference color greatly simplifies the task for a software designer in developing a GUI in many instances. Moreover, the software designer may be assured that the resulting colors conform with accessibility guidelines and good design practices.

Figure 1A:
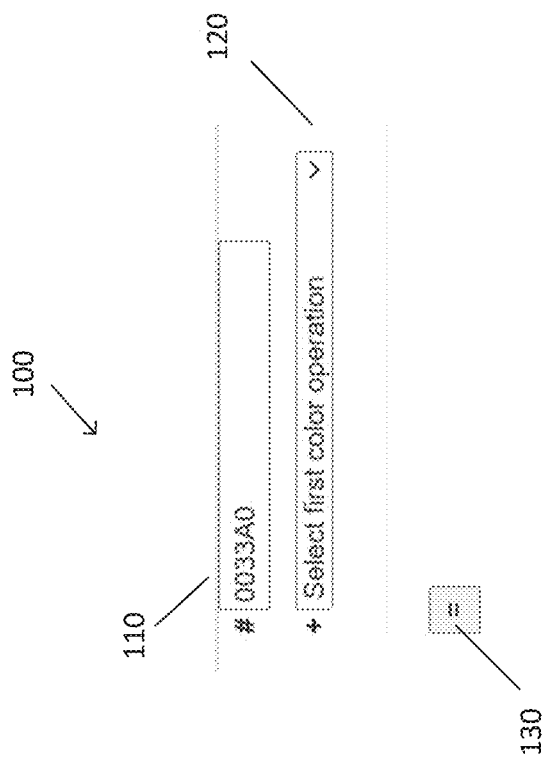
FIG. 1A depicts an illustrative user interface for exemplary embodiments before a first color operation has been selected.

FIG. 1A depicts an illustrative GUI 100 that may be generated by the software tool in exemplary embodiments. The GUI 100 includes a text box 110 in which a color value for a target color may be entered. In this illustrative case, the text box 110 accepts a RGB value specified in hexadecimal. In the hexadecimal encoding, the first two hexadecimal positions specify the red level of the color, the second two hexadecimal positions specify the green level of the color, and the final two hexadecimal positions specify the blue level of the target color. Thus, each primary color (red, green or blue) may have one of 256 different level values (ranging from 0 to 255) specified by the hexadecimal color value for the encoded color. The value of "0033A0" specifies a blue color value. The GUI 100 also includes a drop-down list box 120. The drop-down list box 120 includes a drop-down list of first color operations that may be performed on the target color represented by the color value in text box 110. A button 130 labeled as "=" may be selected to display information regarding both the target color associated with the color value in text box 110 and the resulting derived color value that results from applying color operations, as will be described in more detail below.

Figure 1B:
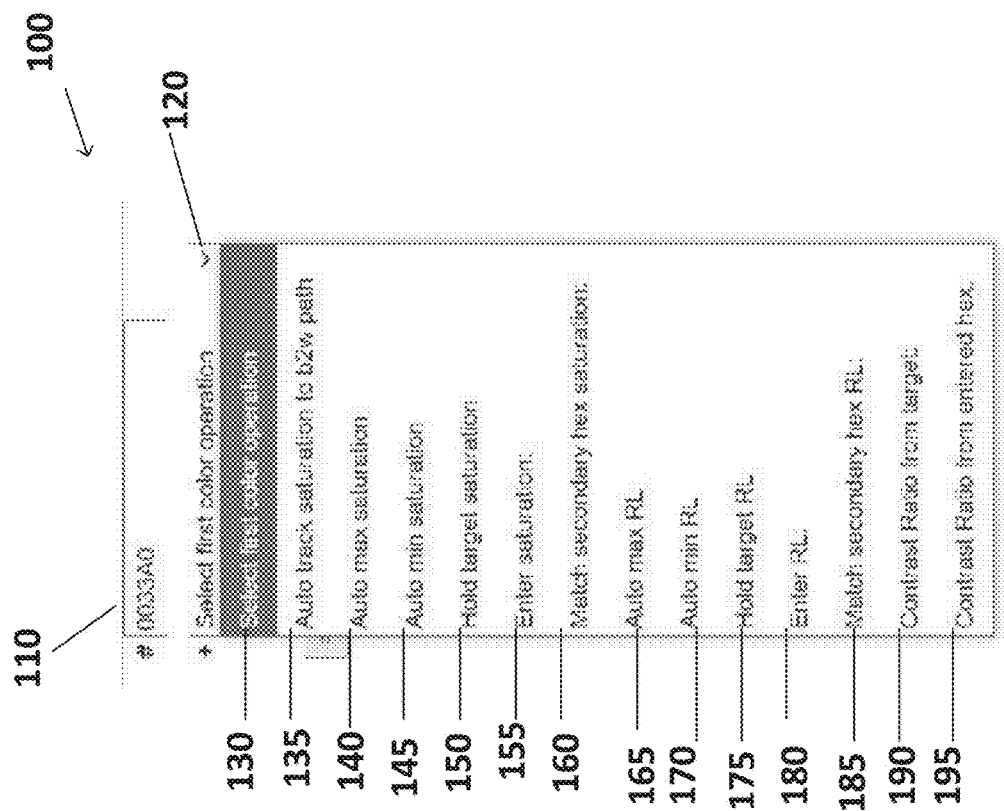
FIG. 1B depicts the illustrative user interface for the exemplary embodiments with the drop-down list for the first color operation expanded.

FIG. 1B shows the GUI 100 when the drop-down list box 120 has been selected to be expanded. The drop-down list box 120 list operations that may be applied to the color represented by the target color value in the text box 110 in deriving a desired color. The drop-down list box 120 includes a prompt 130 to select a color operation.

Options 135, 140, 145, 150, 155, and 160 relate to adjusting the saturation value of the target color to derive the desired color. Color saturation (hereinafter "saturation") refers to the intensity of color in an image. As saturation increases for colors, the colors appears more pure. As saturation decreases for colors, the colors appear to be more washed-out or pale. Saturation is how grey or not grey a color appears to the human eye. The list of possible color operations includes an option 135 to automatically select the saturation value in accordance with a gradient from black to white using a monochromatic path based on the RGB ratio of the target color. The RGB ratio is the ratio among the hexadecimal red, green and blue values within a hexadecimal representation of a color. The RGB ratio stays constant regardless of changes in relative luminance and saturation.

The list of possible color operations also includes an option 140 to apply a programmatically determined maximum saturation value at the relative luminance of the RGB ratio of the target color. Option 145 automatically applies a programmatically determined minimum saturation value at the relative luminance of the RGB ratio of the target color. Option 150 holds the saturation value at that of the target color. Option 155 prompts the user to enter a saturation value that is applied to the target color. Option 160 prompts the user to enter a hexadecimal color value and then set the saturation value to match the saturation value of the color associated with the entered hexadecimal value.

Options 165, 170, 175, 180, and 185 all relate to applying a change in relative luminance. Relative luminance refers to the relative brightness of any point in a color space and can be thought of as how bright a color appears to the human eye. Relative luminance may be normalized to have a value between zero, which indicates a darkest brightness, and one, which indicates a greatest brightness. Option 165 selects the highest (i.e., brightest) relative luminance value for the RGB ratio at the saturation level for the target color. Option 170 selects the lowest (i.e., darkest) relative luminance value for the RGB ratio at the saturation level for the target color. Option 175 sets the relative luminance at the relative luminance value of the target color. Option 180 produces a prompt for the user to enter a relative luminance value that is to be applied to the target color in deriving the desired color. Option 185 prompts the user to enter a second hexadecimal color value for a color and applies the relative luminance of the color represented by the secondary hexadecimal value to the target color in deriving the desired color.

Options 190 and 195 relate to applying the change in contrast ratio to the target color in order to derive the desired color. Option 190 prompts the user to enter a contrast ratio separation value relative to the target color. The contrast ratio separation may be in a range between −21 and 21. The entered contrast ratio separation is to be applied to the target color in deriving the desired color. Option 195 prompts the user to enter a hexadecimal color value and a contrast ratio separation value. Option 195 identifies a desired color that has the entered contrast ratio separation relative to the color represented by the entered hexadecimal color value.

Figure 2A:
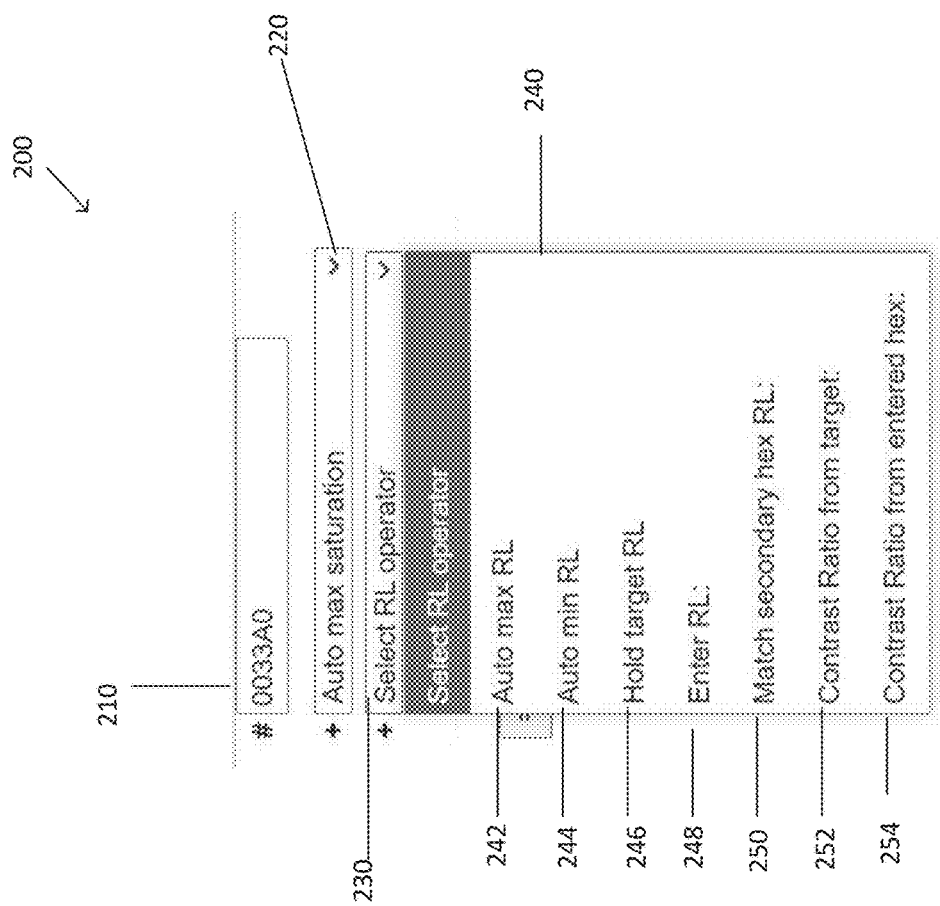
FIG. 2A depicts the illustrative user interface for the exemplary embodiments with the drop-down list for relative luminance operations expanded.

In addition to displaying the drop-down list box 120 to select a first color operation, as shown in FIG. 2A, the GUI 200 may also automatically generate and display a secondary list box 230 for selecting a second change operation that is to be applied to the target color. In the example depicted in FIG. 2A, the secondary list box 230 prompts the user to select a relative luminance operation. Option 242 applies a maximum relative luminance value to the target color in deriving the desired color given the selected saturation and RGB ratio of the target color. Option 244 applies the minimum relative luminance value given the selected saturation and the RGB ratio of the target color. Option 246 holds the relative luminance value to that of the target color. Option 248 prompts the user to enter a relative luminance value that is to be applied to the target color to derive the desired color. Option 250 prompts the user to enter a secondary hexadecimal color value for a color. The relative luminance for the derived color is selected to match the color represented by the entered secondary hexadecimal value. Option 252 prompts the user for a contrast ratio separation from that of the target color and sets the contrast ratio for the derived color to that of a color that is separated by the specified contrast ratio separation from the target color. The contrast ratio specifies the relationship between the relative luminance of two different colors. Option 254 prompts the user to enter a hexadecimal color value for a secondary color, prompts the user for a contrast ratio separation from that of the secondary color and sets the contrast ratio for the derived color to that of a color that is separated by the specified contrast ratio separation from the secondary color.

Thus, from the above discussion, it is apparent that the software tool enables multiple color characteristics of the target color to be changed to derive the desired color. For example, as shown in FIG. 2A, the saturation and their relative luminance of the target color may be changed to derive the desired color. Alternatively, in some instances, only a single color characteristic of the target color may be changed to derive the desired color.

Figure 2B:
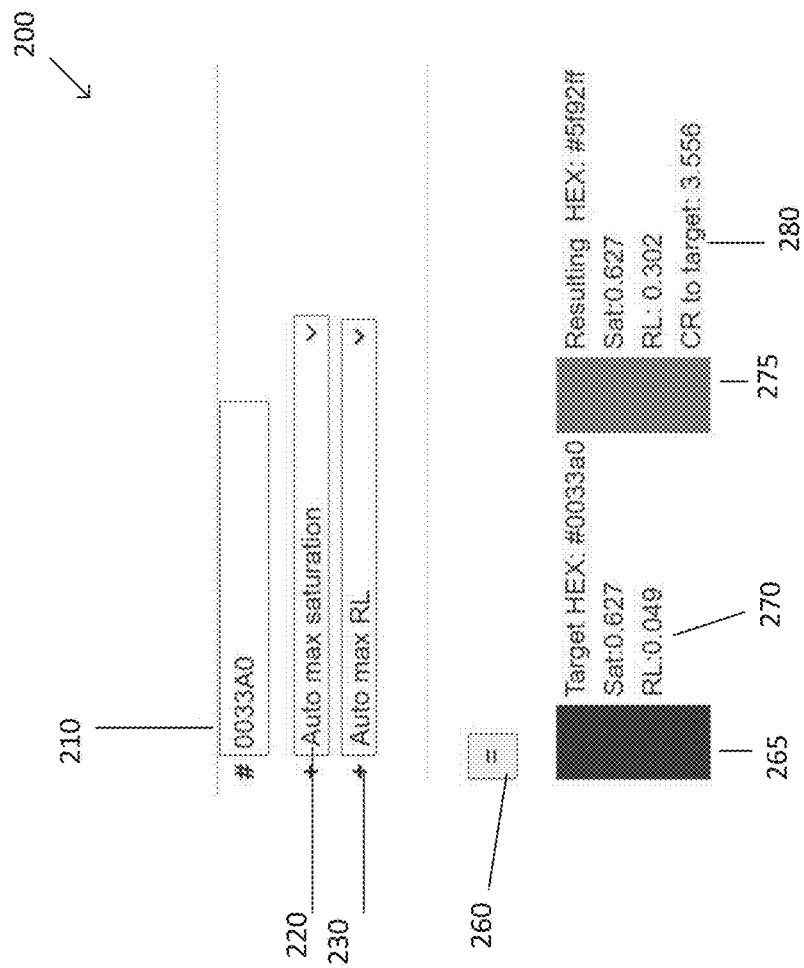
FIG. 2B depicts the illustrative user interface for the exemplary embodiments where the user has chosen to apply the maximum permissible saturation and the maximum permissible relative luminance to derive the desired color.

FIG. 2B shows an example of the user interface 200 when the secondary drop-down list box 230 selects the secondary operation to be applying the maximum possible relative luminance to derive the derived color and button 260 is activated by selection. The GUI 200 now displays the hexadecimal code for the target color in text box 210, the selection of applying the maximum saturation possible in drop-down list 220, and the selection of applying the maximum relative luminance in drop-down list 230. The GUI 200 updates when button 260 is selected to show the target color 265 and the derived color 275. The display of the target color 265 and the derived color 275 in close proximity to each other helps the user to compare and contrast these colors 265 and 275. In addition, the GUI 200 displays information 270 regarding the target color. This information 270 specifies the hexadecimal encoding of the color value for the target color, the saturation value for the target color and the relative luminance value for the target color. Similarly, information 280 is displayed regarding the desired color 275. The information 280 includes the hexadecimal encoding for the desired color, the saturation value for the desired color, and the relative luminance for the desired color. In addition, the information 280 displays the contrast ratio of the desired color relative to the target color. The information 280 is useful to the user to understand the resulting saturation level, relative luminance and contrast ratio relative to the target color for the derived color. The information 280 also is useful in that it includes the hexadecimal color code for the derived desired color.

Figure 3:
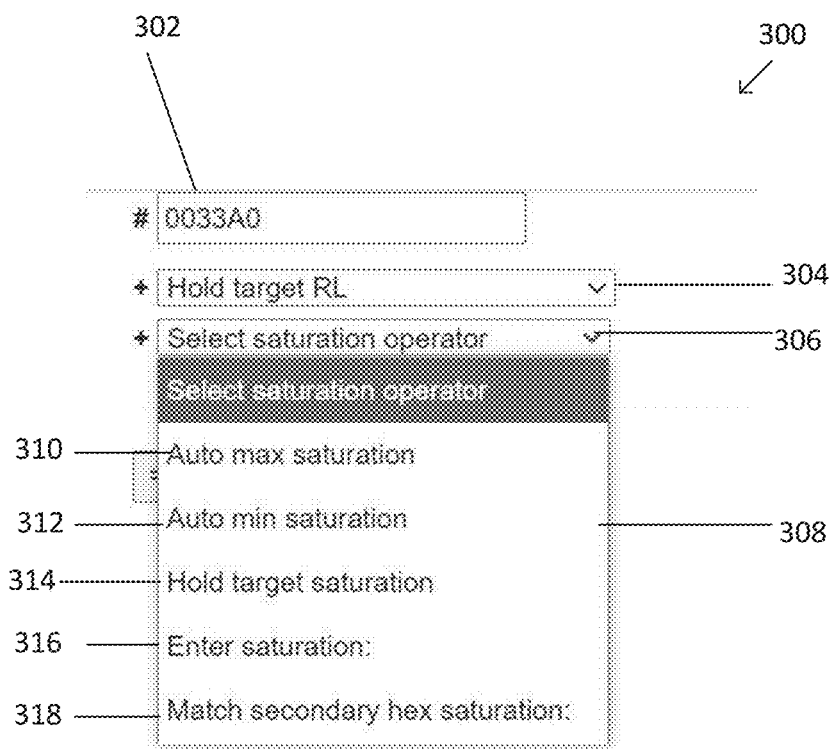
FIG. 3 depicts the illustrative user interface for the exemplary embodiments where the user has selected the operation of holding the relative luminance the same as the target color and where the saturation operation list is expanded.

In some instances, as shown in FIG. 3, the GUI 300 may display a secondary drop-down list box 306 relating to saturation operations. In GUI 300, text box 302 displays a hexadecimal color code for the target color. Drop-down list box 304 indicates that the user selected to hold the relative luminance for the derived color at the relative luminance of the target color. A secondary drop-down list box 306 is displayed and includes a list 308 of saturation operations that may be applied to the target color in deriving the desired color. The options in the list 308 include option 310 of setting the saturation value at the maximum permissible saturation value given the selected relative luminance and RGB ratio of the target color. Option 312 sets the saturation value for the derived color at the minimum permissible saturation value given the selected relative luminance and RGB ratio of the target color. Option 314 sets the saturation value for the derived color as that of the target color. Option 316 prompts the user to enter a saturation value. Option 318 prompts the user to enter a secondary hexadecimal color code and sets the saturation value as that of the secondary color encoded by the secondary hexadecimal color code.

Figure 4:
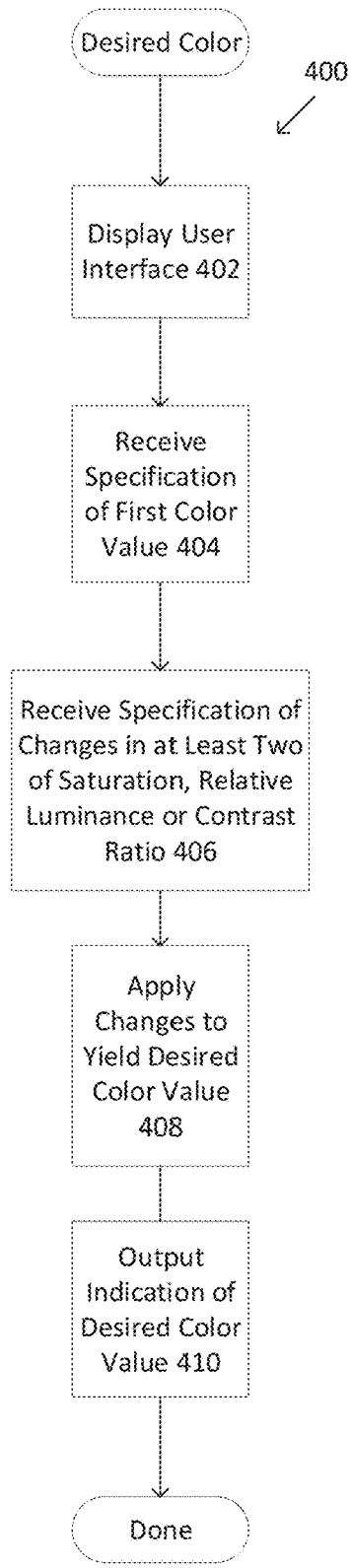
FIG. 4 depicts a flowchart of illustrative steps that may be performed to derive a desired color by changing color characteristics of a target color in exemplary embodiment.

As was mentioned above, the GUI provided by the software tool in the exemplary embodiments may allow a user to produce a desired color from a target color by applying multiple color characteristics changes to the target color. FIG. 4 depicts a flowchart 400 of illustrative steps that may be performed in exemplary embodiments to realize such a derivation of the desired color from the target color. At 402, the user interface (i.e., GUI) is displayed on a display device. The user interface may take the form of that depicted above in FIGS. 1A-3B or may take other forms. It should be appreciated the user interface may include different types of user interface elements and different organizations of those elements. Via the user interface, the software tool receives a specification of a first color value at 404. For example, the user may enter a hexadecimal RGB color value in text box 110. At 406, the software tool then receives specification of changes in at least two of saturation, relative luminance, or contrast ratio that are to be applied in deriving the derived color from the target color. In some exemplary embodiments, these may be entered via the user interface, such as via drop-down list boxes 220 and 230. At 408, the software tool applies the specified changes to the color characteristics to yield the desired color value by applying the changes to the target color. The software tool possesses the requisite logic to perform the specified color characteristics changes. At 410, an indication of the desired color value is output. FIG. 2B shows an example where the desired color 275 is displayed along with information 280 that includes the color code for the desired color as well as color characteristics information for the desired color.

Figure 5:
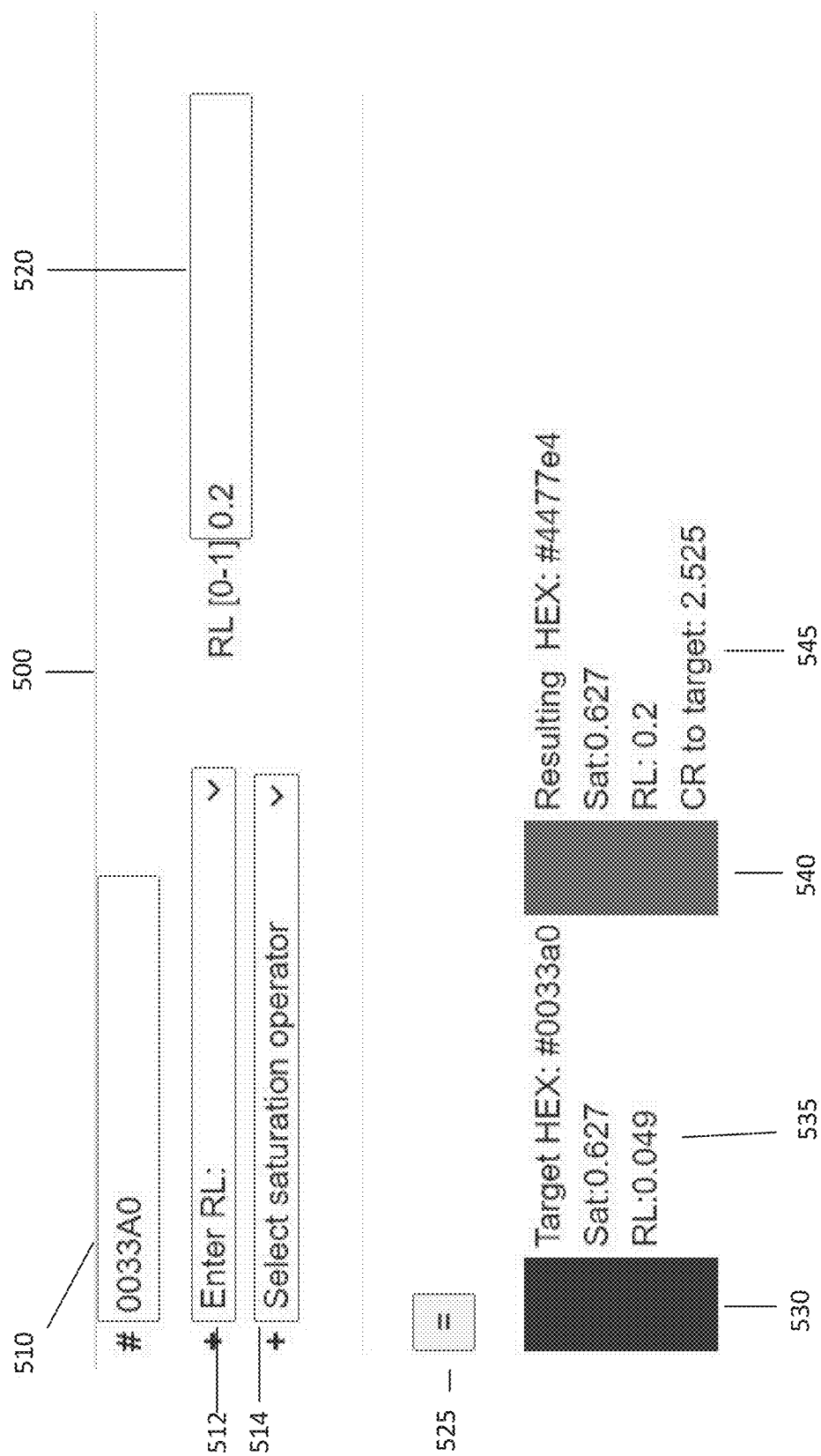
FIG. 5 depicts the illustrative user interface for an exemplary embodiment where the user has selected to enter a relative luminance value for the desired color.

The software tool of the exemplary embodiments provides capabilities that are useful to the software designer in identifying colors to use in a GUI. One such capability is to choose a desired color with the same RGB ratio but a different relative luminance as illustrated in FIG. 5. As shown, the user interface 500 includes a text box in which a hexadecimal code for a target color has been entered. The user has selected to enter a relative luminance value as evidenced by the drop-down list 512 showing "Enter RL." In addition, a text box 520 is shown. The user has entered a relative luminance value of 0.2 in the text box 520. Drop-down list box 514 is displayed for the user to select a saturation value, but the user has chosen to not enter a saturation value. The user has selected the button 524 so that the target color 530 and the desired color 540 are displayed. Information 535 about the target color and information 545 about the desired color are displayed. As can be seen, the target color 530 and the desired color are both blue (i.e., have same RGB ratio) but differ as to relative luminance. The desired color 540 has a relative luminance of 0.2, and the target color has a relative luminance 0.049.

Another useful capability provided by the software tool is to enable a user to enter a contrast ratio value as well as a secondary hex value whose relative luminance the user wants to move away from. For example, suppose that a user wishes to find a yellow that has a contrast ratio that is three times brighter than a shade of blue. The user may enter a hexadecimal code for the yellow as the target color, the contrast ratio of 3 and the hexadecimal code of color the user wished to move away from in a secondary hexadecimal text box.

Figure 6:
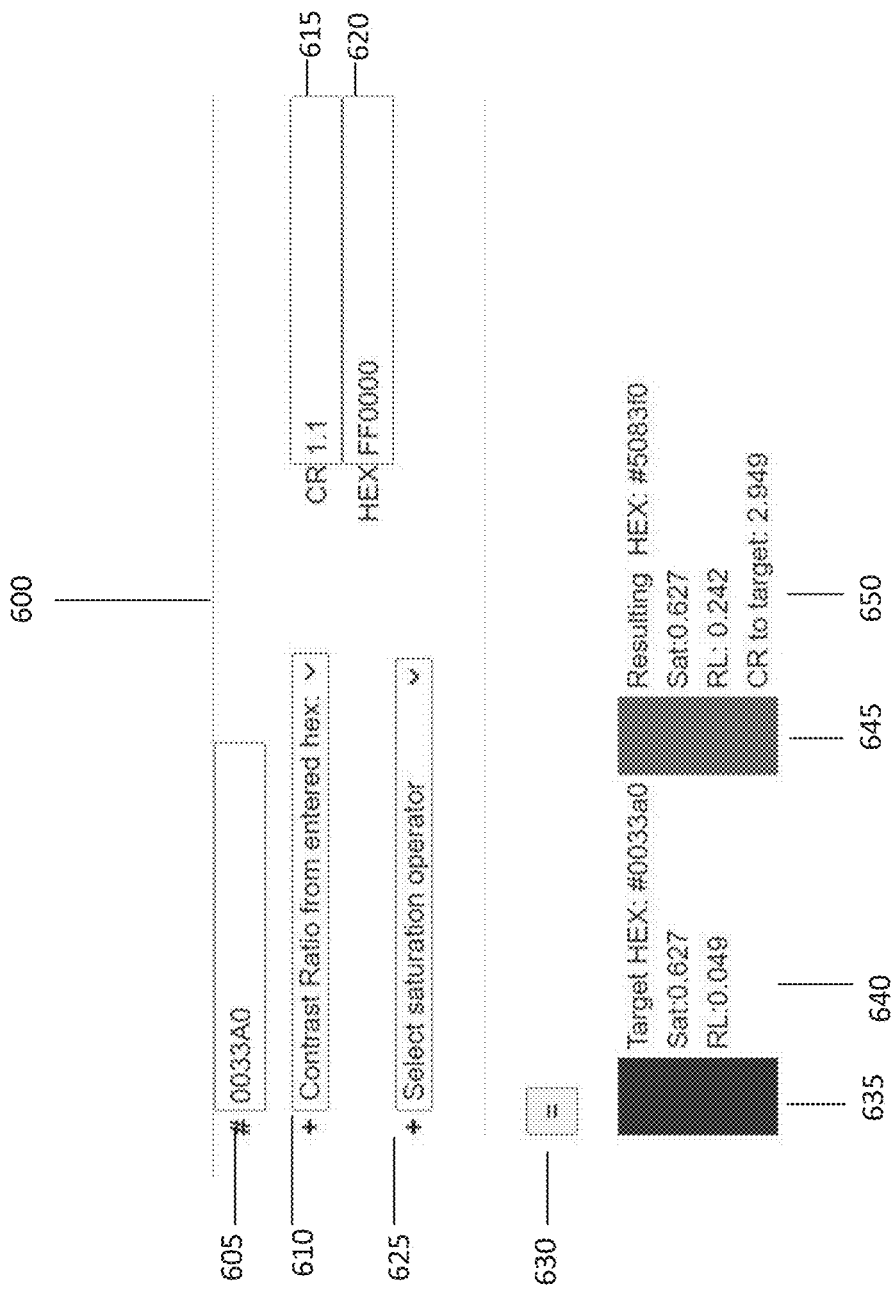
FIG. 6 depicts the illustrative user interface for an exemplary embodiment where the user has specified a contrast ratio separation of the desired color relative to a secondary color.

FIG. 6 depicts a user interface 600 for this capability. The user interface 600 includes a text box 605 in which a hexadecimal color code value has been entered for a target color. The user has selected the operation of choosing a specified contrast ratio separation based upon a secondary hexadecimal value as indicated by the selection from drop-down list box 610. A contrast ratio value of 1.1 has been entered in text box 615, and a secondary hexadecimal value has been entered in text box 620. The button 630 has been selected so that target color 635 and associated information 640 are displayed, as is the desired color 645 and associated information 650.

Figure 7:
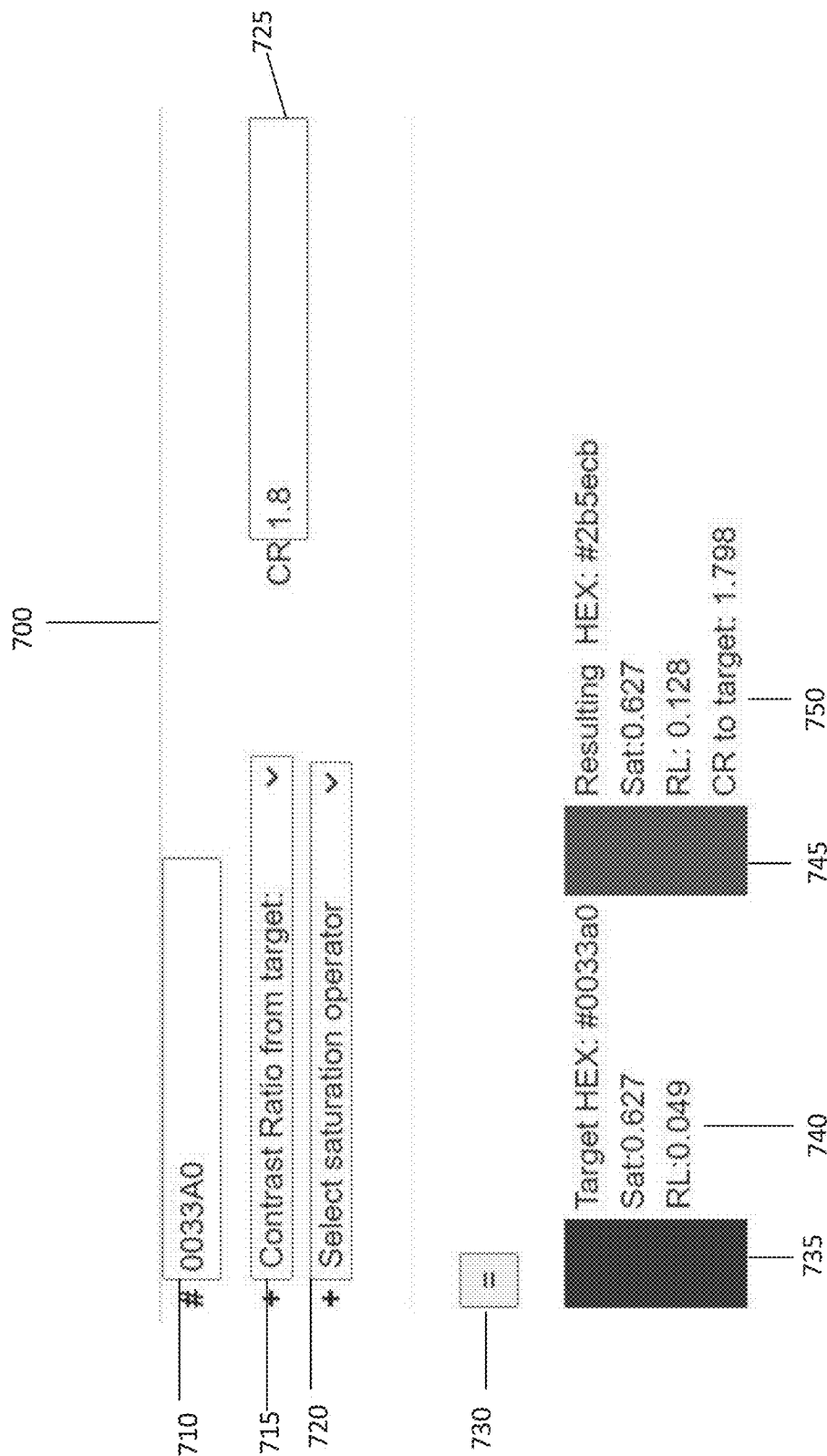
FIG. 7 depicts the illustrative user interface for an exemplary embodiment where the user specifies a contrast ratio separation of the desired color relative to the target color.

An additional capability provided by the software tool is to identify a color that has a contrast ratio separation from a color, such as a target color. FIG. 7 depicts an illustrative user interface 700 for illustrating this capability. The user interface 700 has a text box 710 in which a hexadecimal color code for a target color has been entered. The user has selected the operation of the specifying a contrast ratio from the target color in the drop-down list 715. The user has entered a 1.8 contrast ratio separation value in text box 725. A drop-down list 720 is displayed to give the user an option to select a saturation operation, but the user has chosen not to not select such a saturation operation. The user has selected button 730. The target color 735 is shown along with information 740 about the target color 735. The desired color 745 is shown along with information 750 about the desired color. As is shown, the desired color 745 has a contrast ratio of 1.798 or roughly 1.8 relative to the target color 735.

Figure 8:
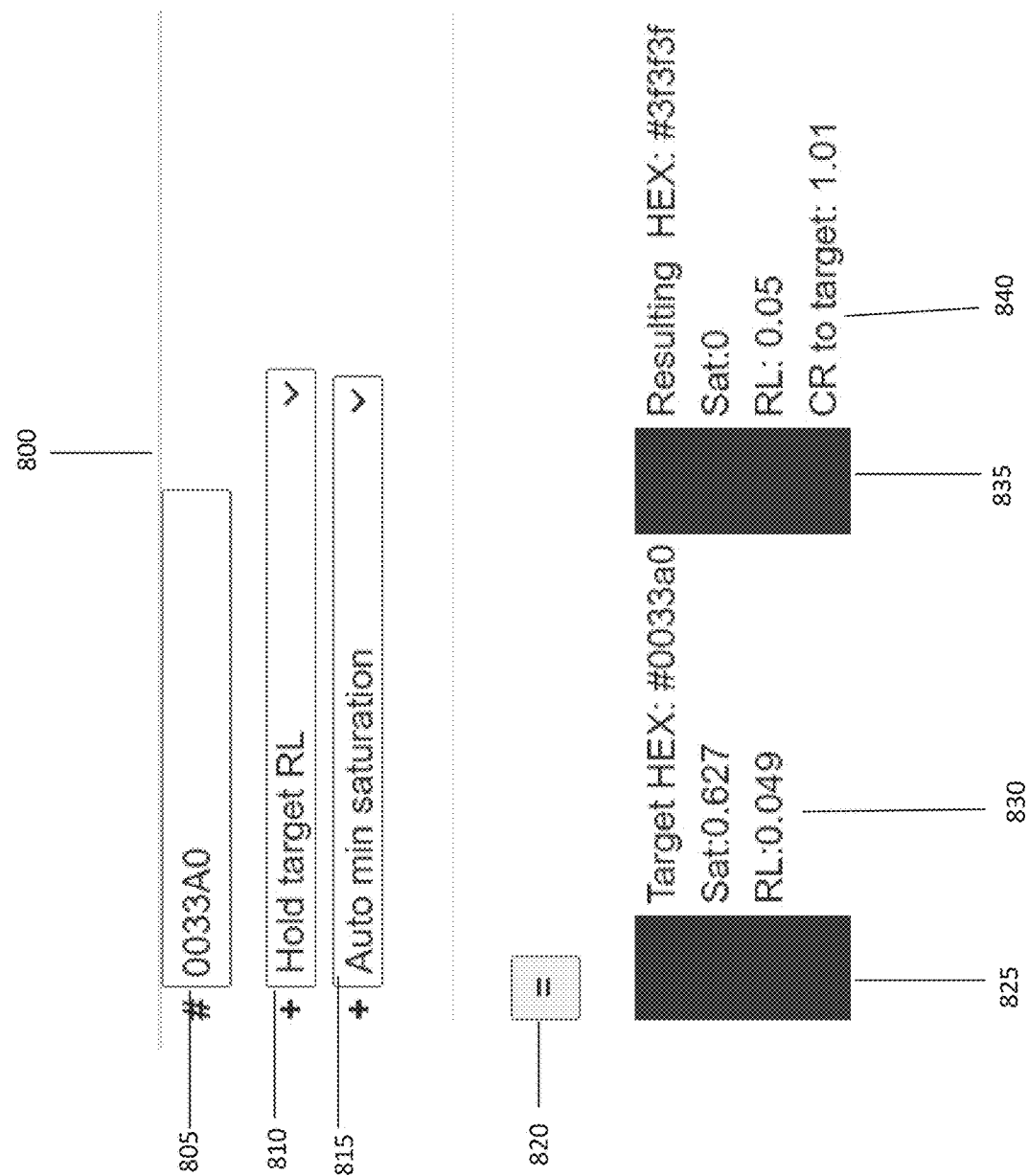
FIG. 8 depicts the illustrative user interface for the exemplary embodiments where the user chooses to have the desired color have the relative luminance of the target color and the minimum saturation.

An additional capability of the software tool is to find a color that has a same relative luminance as a target code but a different saturation. FIG. 8 illustrates an example user interface 800 that may be provided by the software tool in realizing this operation. The user interface 800 includes a text box in which the user has entered the hexadecimal code for the target color. Drop-down list box 810 shows that the user has selected the first operation of holding the relative luminance of the desired color to be the same as the target color. A second drop-down box 815 is displayed. The user has selected the saturation operation of changing the saturation for the desired color to the minimum permitted saturation. Button 820 has been selected by the user, so the target color 825 and associated information 830 are displayed. The desired color 835 and associated information 840 are displayed. As can be seen, the saturation of the target color and the desired color are different. The target color has a saturation of 0.627, whereas the desired color has a saturation of 0. In addition, the relative luminance of the target color of 0.049 is roughly equal to the relative luminance of the desired color of 0.05.

Figure 9:
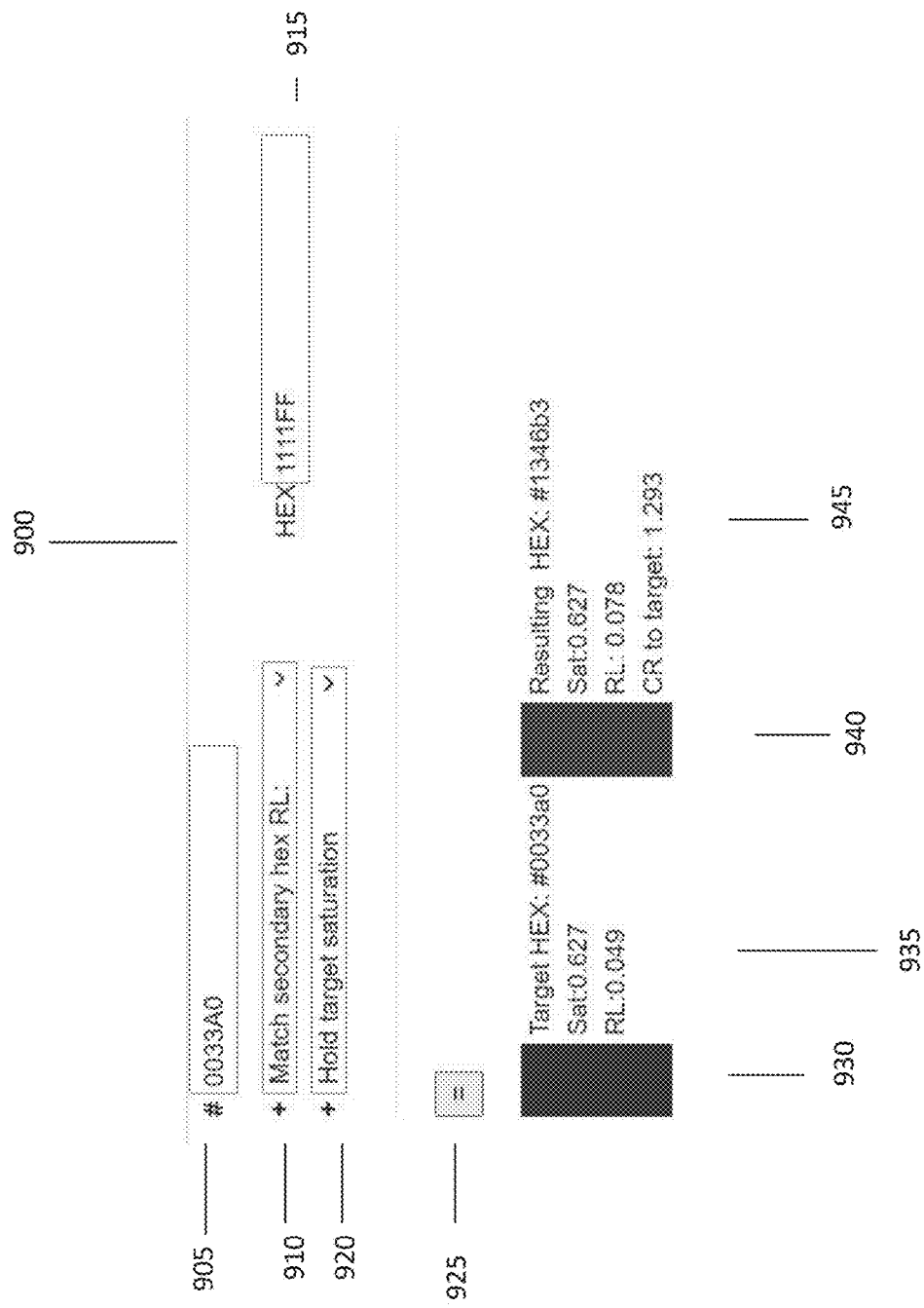
FIG. 9 depicts the illustrative user interface for the exemplary embodiments where the user chooses to have the desired color have a relative luminance that matches that of a secondary color and have the saturation of the target color.

A further capability provided by the software tool is the capability to have the derived color match the relative luminance of a secondary color that the user may enter. FIG. 9 depicts an illustrative user interface 900 for such a case. A hexadecimal color code value for a target color has been entered by the user in text box 905. The user has chosen the operation of matching the relative luminance to a secondary color in drop-down list box 910. A secondary hexadecimal color code has been entered in text box 915 by the user. The saturation level has been held to match the target color saturation as evidenced by the selection in drop-down list 920. Button 925 has been selected. The target color 930 and associated information 935 are displayed. The desired color 940 and the associated information 945 are displayed. The relative luminance value (0.078) of the desired color matches that of the secondary color with the color code 1111FF.

The software tool of the exemplary embodiments may generate color palettes for use by a software designer in generating a GUI. FIG. 10 displays an illustrative color palette. FIG. 10 depicts categories of colors that may be found in the illustrative color palette 1000. The color palette 1000 may include background colors 1002 that are suitable for use in the background of the GUI. The color palette 1000 may also include control/content level colors 1004 for use in controls in the GUI or content in the GUI. The color palette 1000 may include text colors 1006 for coloring text in the GUI. The color palette 1000 may include data visualization colors 1008 for color data visualizations, like graphs or charts. The colors in each category are selected to be well suited for the designated use. Suppose that the software designer needs to color the background of the GUI, the software designer only needs to search the colors in the background colors 1002. The software designer can be confident that the colors in the background colors 1002 are well-suited for such use.

Figure 11A:
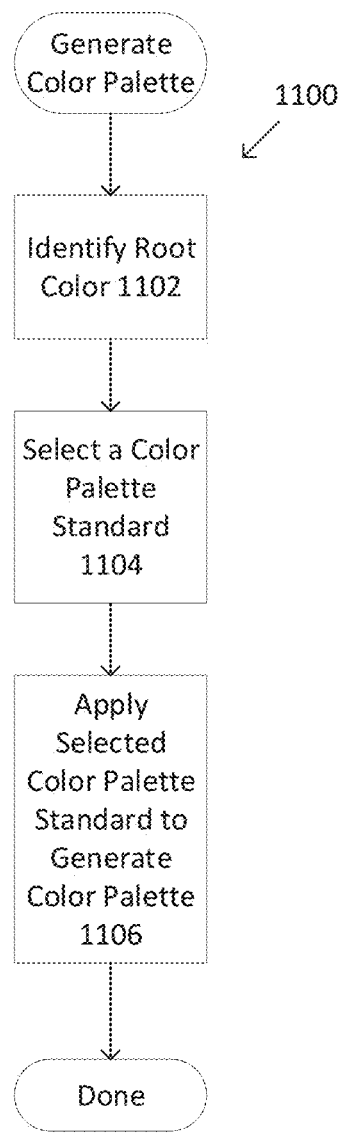
FIG. 11A depicts a flowchart of illustrative steps that may be performed in the exemplary embodiments to generate a color palette.

FIG. 11A depicts a flowchart 1100 of illustrative steps that may be performed in exemplary embodiments to produce a color palette. First, at 1102, the software designer identifies a root color. The other colors in the color palette relate to the root color. The root color may be, for instance, a brand color associated with an organization, such as a company. At 1104, a palette standard in then selected by the software designer. There may be different palette standards available for selection. Each palette standard encodes how to generate the colors in the color palette from the root color. Each palette standard may be the result of determining how the root color deviates from a pure form of the color across color channels, saturation, and relative luminance and applying the determined deviations to a different color. Consider a simple palette having just a red value, a green value and a blue value. The root value is a reference blue color represented by a hexadecimal value (e.g., #0033A0). This color has a deviation from pure blue (e.g., a hexadecimal value of #0000FF) in saturation. Specifically, the root color represented by #0033A0 has a saturation of roughly 63% of full saturation. The root color also deviates in relative luminance and in relative amounts of red, green and blue from pure blue. These deviations are determined and applied to the other colors for a palette to yield a red color and a green color for the palette. A red value of #A03300 may be chosen that matches the determined deviation in saturation and relative luminance with the blue color represented by #0033A0. The red value has a similar amount of green as the reference blue color (i.e., #33). A green value of #33A000 may be chosen based on the deviations and relative amounts of red, green and blue. This process may be extended to the full color palette where additional colors are needed.

At 1106, the selected color palette standard is then applied to generate the desired color palette. Each category of color as detailed in FIG. 10 may have its own rules as to relative luminance and saturation. These rules may be applied to generate colors for the category relative to the reference color. This approach mimics the disposition of the relative amounts of red, green and blue, saturation, and relative luminance from the reference color(s), while assuring the integrity of color use for functional applications. The software tool does this by performing calculations, rather than relying on designers to do this "by eye."

Different color palettes may be generated for different lighting conditions from a baseline color palette. FIG. 11B depicts an example set of color palettes for different lighting conditions. The contrast ratios for colors in the palettes may change depending on lighting conditions. There is a low lighting color palette 1120 for use in low lit environment, such as a darkened room. There is a medium lighting color palette 1122 for normal well-lit environments and a bright lighting color palette 1124 for brightly lit environments.

Figure 12:
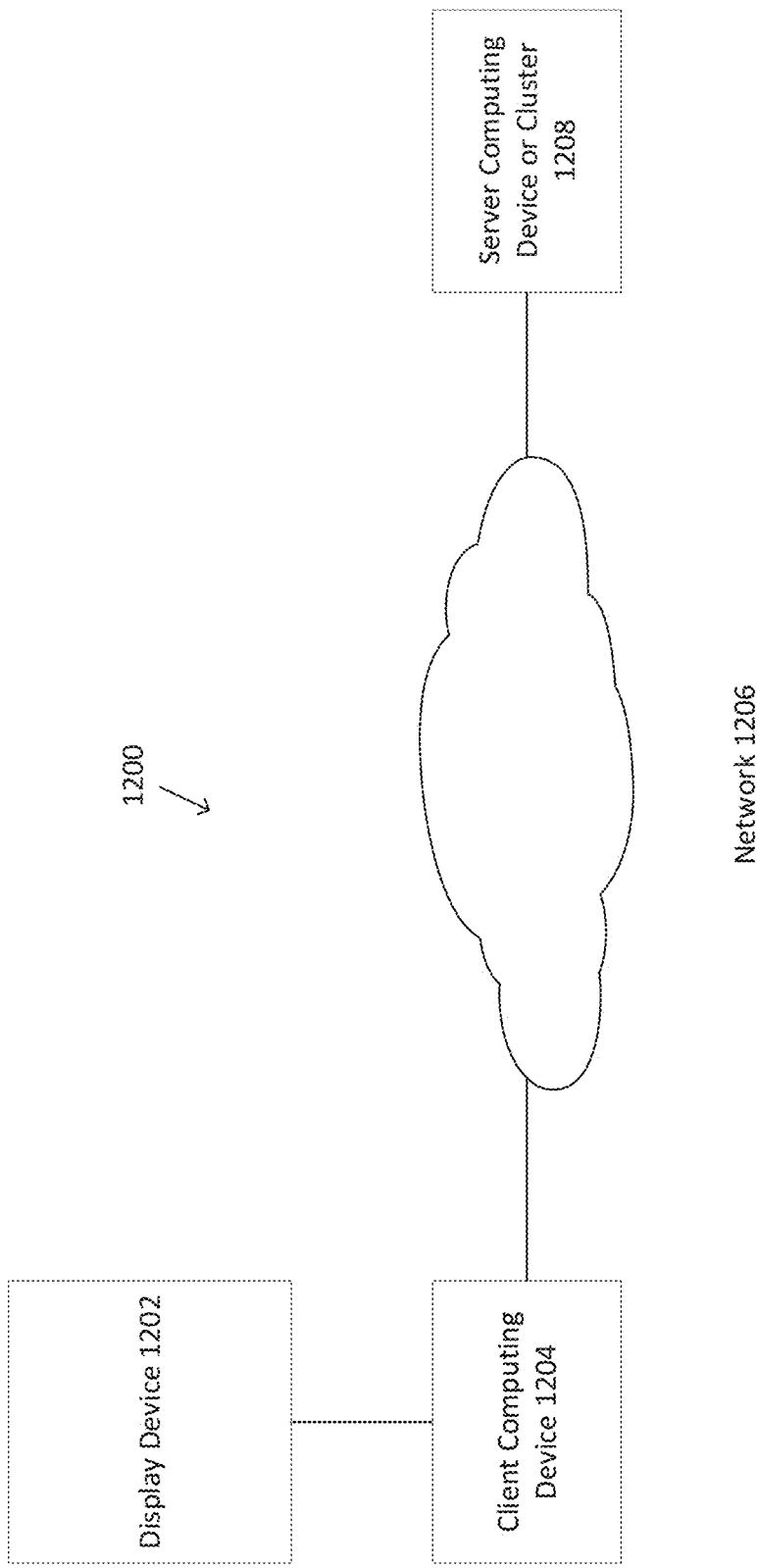
FIG. 12 depicts a computing environment suitable for practicing the exemplary embodiments.

FIG. 12 depicts a computing environment 1200 suitable for practicing the exemplary embodiments. A client computing device 1204 may be provided for a user to access the software tool. The client computing device 1204 may be a desktop computer, a laptop computer, a tablet computer or another variety of computing device. In some embodiments, the client computing device 1204 may be an embedded system in an electronic device. The client computing device 1204 has a display device 1202 for displaying graphical content, text and/or video. In some embodiments, the software tool may be run locally on the client computing device 1204. In other embodiments, the software tool may run on a server computing device or a cluster 1208 that is connected to the client computing device via a network 1206. The server computing device or cluster 1208 may be a cloud service in some instances. The server computing device or cluster 1208 may host a website that is accessible to the client computing device over the Internet via a web browser in some embodiments. The network 1206 may include one or more local area networks (LANs) and wide area networks (WANs) such as the Internet or the like.

Figure 13:
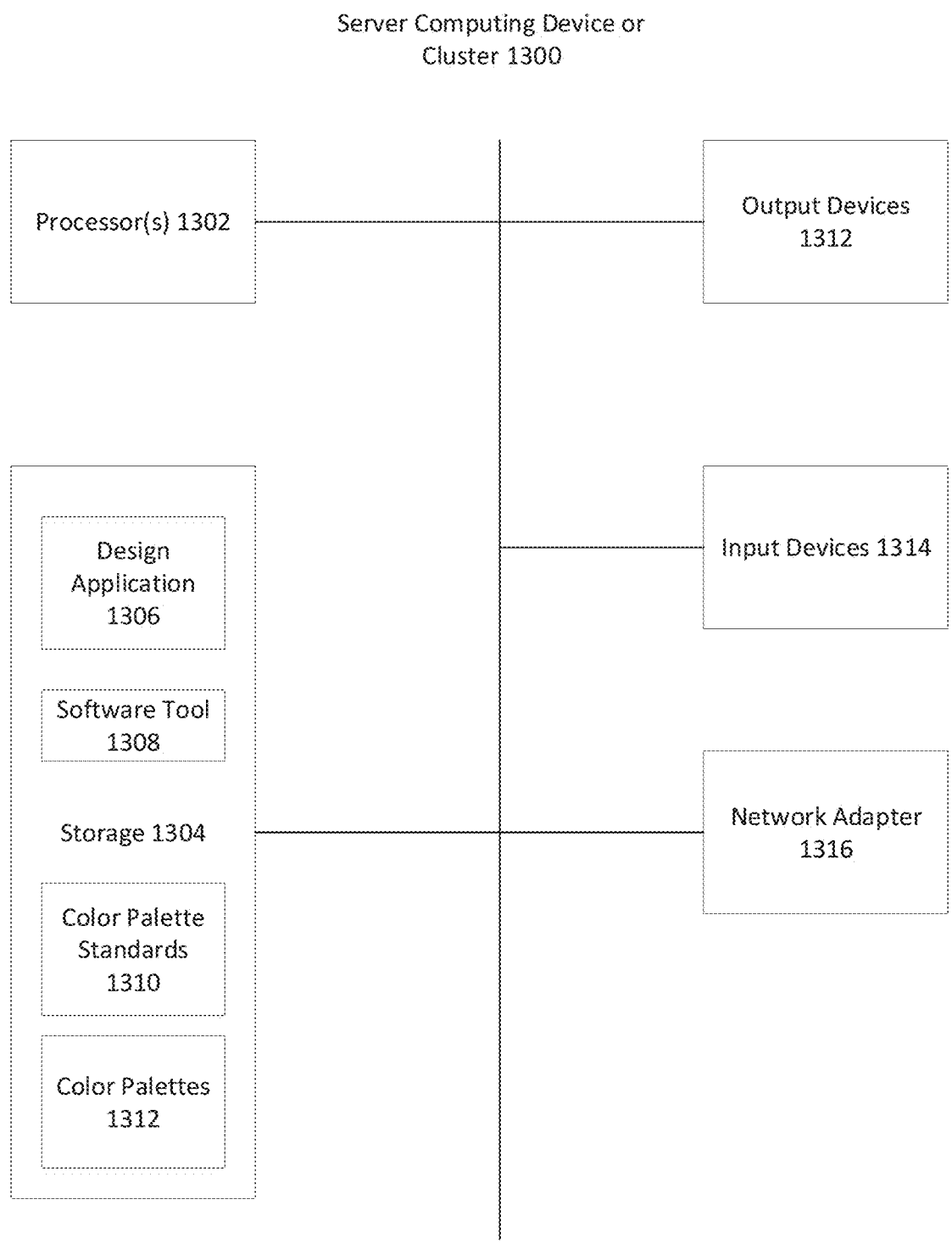
FIG. 13 depicts illustrative components of a server computing device or cluster.

FIG. 13 depicts illustrative components for the server computing device of cluster 1300. One or more processors 1302 may be provided for executing computer programming instructions. The processor(s) 1302 may include a central processing unit (CPU), a graphics processing unit (GPU), a field gate programmable array (FPGA) or an application specific integrated circuit. The server computing device or cluster 1300 may include a storage 1304 for storing computer programming instructions for execution by the processor(s) 1302, data and other items. The storage 1304 may include primary memory and secondary memory. The storage 1304 may include a variety of non-transitory computer-readable storage media, including random access memory (RAM), read only memory (ROM), solid state memory, magnetic storage media, optical storage media or the like. The storage may store a design application 1306 that may be executed to provide GUI design capabilities to the user. The software tool 1308 may be stored in the storage 1304 described herein. The user may access the software tool as a service and may be realized as a web application. The software tool 1308 may be integrated into the design application in some instances. The storage may also store color palette standards 1310 and color palettes 1312. The server computing device or cluster 1300 additionally may include output devices 1312, like a display, input devices 1314, like a keyboard or mouse. A network adapter 1316 for interfacing with a network.

Figure 14:
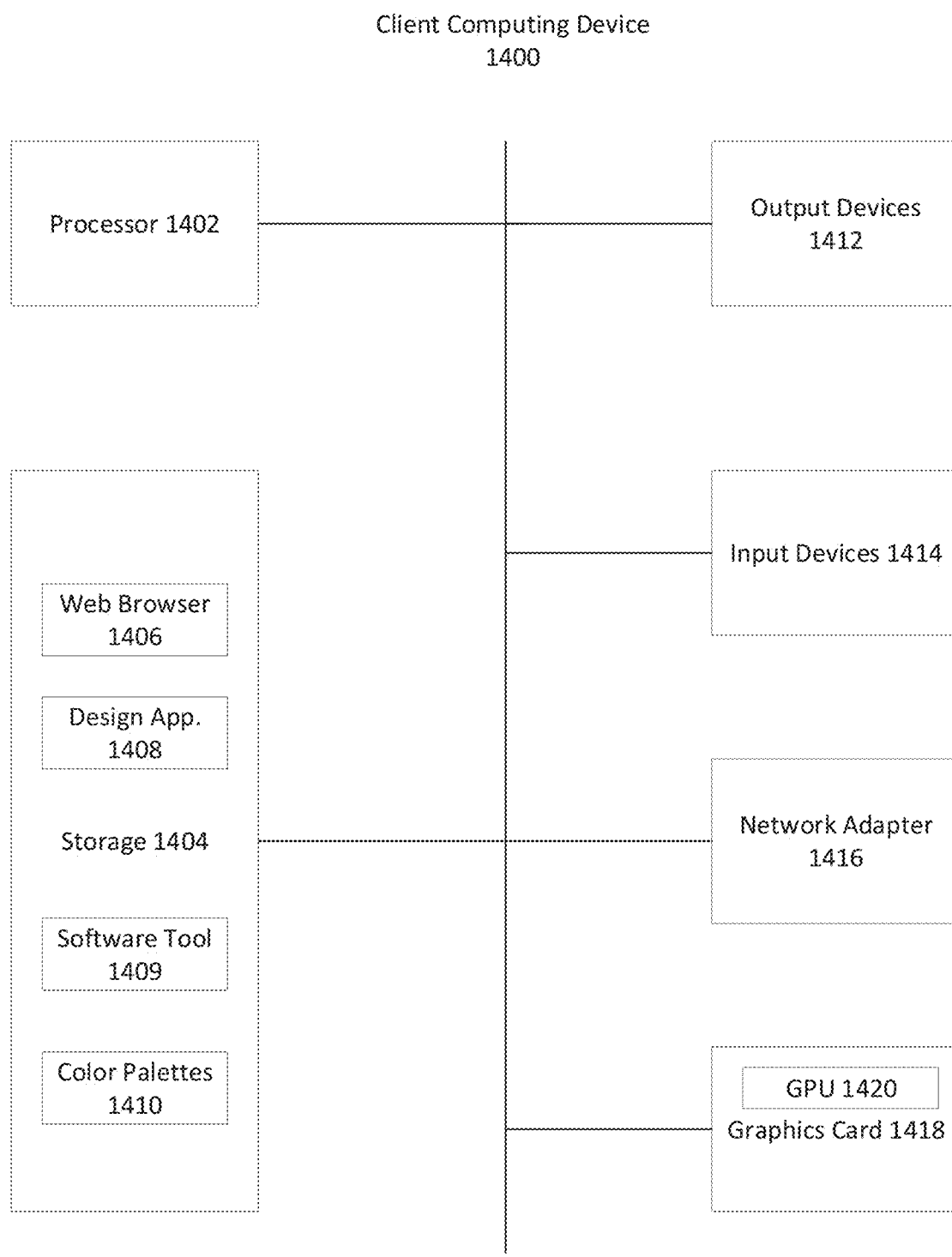
FIG. 14 depicts illustrative components for a client computing device.

FIG. 14 depicts illustrative components for the client computing device 1400. The client computing device 1402 may include a processor 1402. The processor may be a CPU, GPU, ASIC or the like. The processor has access to a storage 1404. The storage 1404 may include a variety of non-transitory computer-readable storage media, including random access memory (RAM), read only memory (ROM), solid state memory, magnetic storage media, optical storage media or the like. The storage 1404 may store a web browser 140, a design application 1408 for designing a GUI and the software tool 1409 for execution by the processor. In some embodiments, the software tool 1409 and the design application 1408 may not be present but rather may be run on the server computing device or cluster. Color palettes 1410 may be stored in the storage 1404 for use in designing GUIs. The client computing device 1400 may include output devices 1412, like a display device or printer. The client computing device 1400 may include input devices 1414, like a keyboard, mouse, thumbpad or microphone. The client computing device 1400 may include a network adapter 1416 for interfacing with the network 1206. The client computing device 1400 may include a graphics card 1418 with a GPU for displaying content on a display device.

While exemplary embodiments have been described herein, various changes in form and detail may be made relative to the exemplary embodiments without departing from the intended scope of the claims appended hereto.

The invention claimed is:

1. A method performed by a processor of an electronic device, comprising, via the processor:
   outputting a user interface for display on a display device, wherein the user interface comprises:
      an element configured to receive user input specifying a reference color, the reference color comprising a first single color; and
      one or more elements for specifying a change in saturation, relative luminance and/or contrast ratio to be applied to the reference color to determine a desired color, the desired color comprising a second single color;
   receiving via the user interface the user input specifying the reference color;
   receiving via the user interface a specification of a change of at least two of saturation, relative luminance or contrast ratio of the reference color;
   applying the change of at least two of saturation, relative luminance or contrast ratio to the reference color inputted via the element to determine a desired color value of the desired color; and
   outputting on the display device the desired color, as an individual second single color, beside the reference color, as an individual first single color.

2. The method of claim 1, wherein the outputting on the display device of the desired color comprises outputting on the display device at least one of a saturation numerical value for the saturation or a relative luminance numerical value for the relative luminance for the desired color beside the desired color.

3. The method of claim 1, wherein the method further comprises outputting on the display device a hexadecimal encoding for the desired color beside the desired color.

4. The method of claim 1, wherein the receiving via the user interface a specification of a change of at least two of saturation, relative luminance or contrast ratio comprises receiving a specification of a change in saturation and relative luminance.

5. The method of claim 1, wherein the receiving via the user interface a specification of a change of at least two of saturation, relative luminance or contrast ratio comprises receiving a specification of a change in contrast ratio and saturation.

6. The method of claim 1, wherein the one or more elements for specifying a change in saturation, relative luminance and contrast ratio to be applied to the reference color to determine the desired color value of the desired color comprise an element for specifying a programmatically determined maximum saturation, a programmatically determined minimum saturation, a custom saturation or a same saturation as the reference color.

7. The method of claim 1, wherein the one or more elements for specifying a change in saturation, relative luminance and contrast ratio to be applied to the reference color to determine the desired color value of the desired color comprise an element for specifying a programmatically determined maximum relative luminance, a programmatically determined minimum relative luminance, a custom relative luminance or a same relative luminance as the reference color.

8. A method performed by a processor of an electronic device, comprising:
   outputting a user interface for display on a display device, wherein the user interface comprises:
      an element configured to receive user input specifying a first color value for a first color, the first color comprising a first single reference color;
      an element for specifying at least one desired characteristic of an unspecified desired color relative to the first color, the desired color comprising a second single color, wherein the at least one desired characteristic is one of:
         a same RGB ratio as the first color but with a different specified relative luminance than the first color,
         a same RGB ratio as the first color with a specified contrast ratio separation from the first color, and
         a different RGB ratio than the first color with a same relative luminance as the first color, and receiving via the user interface user input specifying the first color value;

receiving via the user interface a selection of the at least one desired characteristic;

based on the received specification of the first color value and the selection of the at least one desired characteristic, determining with the processor what color is the desired color that has the selected desired characteristic relative to the first color; and outputting the desired color on the user interface, as an individual second single color, beside the reference color, as an individual first single reference color.

9. The method of claim 8, wherein the first color value is a red, green, blue (RGB) value.

10. The method of claim 9, wherein the indication of the desired color is a RGB value for the desired color.

11. The method of claim 8, further comprising outputting on the display device as part of the user interface an example of the first color having the first color value and an example of the desired color.

12. The method of claim 8, wherein the at least one desired characteristic is the same RGB ratio as the first color but with the different specified relative luminance than the first color, wherein the method further comprises:

displaying an element on the user interface for receiving a specification of the different relative luminance;

receiving the specification of the different relative luminance via the user interface; and determining a selected color that the same RGB ratio as the first color but with the different specified relative luminance than the first color; and wherein the selected color is determined to be the desired color.

13. The method of claim 8, wherein the at least one desired characteristic is the same RGB ratio as the first color with the specified contrast ratio separation from the first color, wherein the method further comprises:

displaying an element on the user interface for receiving a specification of the contrast ratio separation;

receiving the specification of the contrast ratio separation via the user interface; and determining a selected color that has the same RGB ratio as the first color but has the specified contrast ratio separation from the first color; and wherein the selected color is determined to be the desired color.

14. The method of claim 8, wherein the at least one desired characteristic is the different RGB ratio with the specified contrast ratio separation from the first color, wherein the method further comprises:

displaying an element on the user interface for receiving a specification of the different RGB ratio;

displaying an element on the user interface for receiving the contrast ratio separation;

receiving the specification of the different RGB ratio and the contrast ratio separation via the user interface; and determining a selected color that has the different RGB ratio than the first color and has the specified contrast ratio separation; and wherein the selected color is determined to be the desired color.

15. The method of claim 8, wherein the first color value is a hexadecimal color value.

16. A method performed by a processor of an electronic device, comprising, via the processor:

receiving user input selecting a palette standard defining at least one difference in one of saturation, relative luminance and/or contrast ratio from a reference color for each of a plurality of graphical user interface (GUI) categories, the palette standard encoding a deviation of the reference color from a pure form of a color corresponding to the reference color;

receiving user input specifying the reference color comprising a single color;

applying the palette standard to the reference color to generate a palette of colors for use with the reference color in user interface design, wherein the palette standard specifies how to derive colors to be included in the generated palette of colors from the reference color by modifying saturation, relative luminance and/or contrast ratio of the reference color, wherein the palette of colors comprises a plurality of colors derived from the reference color based on the palette standard; and displaying the palette of colors partitioned into the plurality of GUI categories.

17. The method of claim 16, wherein the plurality of GUI categories comprises a partition of colors designated for text.

18. The method of claim 16, wherein the plurality of GUI categories comprises a partition of colors designated for control elements.

19. The method of claim 16, wherein the plurality of GUI categories comprises a partition of colors designated for background use.

20. The method of claim 16, wherein the palette of colors is for a particular lighting condition.

* * * * *